United States Patent

[11] 3,607,171

[72] Inventor Peter Hirsch
 Oberland, Germany
[21] Appl. No. 780,148
[22] Filed Nov. 29, 1968
[45] Patented Sept. 21, 1971
[73] Assignee VVB Technisches Glas
 Ilmenau, Langewiesener, Germany

[54] METHOD FOR HEATING MELTING OR SOFTENING GLASS IN DISPERSED FORM
4 Claims, 3 Drawing Figs.

[52] U.S. Cl. ................................................. 65/22,
 65/88, 65/141, 65/182, 65/337, 264/176
[51] Int. Cl. ................................................. C03b 19/08
[50] Field of Search ................................................. 65/18, 22,
 62, 65, 88, 89, 99, 141, 144, 335, 337, 21, 182;
 264/176

[56] References Cited
UNITED STATES PATENTS
2,261,022 10/1941 Fox et al. ............................ 65/22
2,437,685 3/1948 Dreyfus ............................ 264/176 F
2,437,687 3/1948 Dreyfus et al. ................. 264/176 F
2,754,559 7/1956 Fromson ............................ 65/182 UX
3,353,940 11/1967 Dolf ............................ 65/21

Primary Examiner—S. Leon Bashore
Assistant Examiner—Robert L. Lindsay, Jr.
Attorney—Nolte and Nolte ABSTRACT: A method of continuously heating, melting or softening a material, comprising in a preferred embodiment disposing in an upright elongated heating zone a fusible substance, heating the substance to maintain the substance in a hot fused condition, introducing into the fused substance near an end of the zone the material being treated, the material and the fused substance being so selected that they are immiscible and are of different specific gravities, the introduction being near the lower end of the zone when fused substance is of higher specific gravity than the material being treated and the introduction being near the upper end of the zone when the fused substance is of lower specific gravity than the material being treated, whereby the material being treated migrates to the end of the zone opposite from the end near which it is introduced and accumulates as a body above or below, depending upon the direction of migration, the fused substance, the material in the course of the migration being heated by the fused substance to the desired heated, softened or molten state.

INVENTOR
PETER HIRSCH

INVENTOR
PETER HIRSCH

METHOD FOR HEATING MELTING OR SOFTENING GLASS IN DISPERSED FORM

This invention relates to a method and an apparatus for the heating, melting or softening of substances in dispersed form, especially for the processing of sand, quartz, alumina, glass frit and for the production of dense or porous quartz, quartz glass, glass or similar substances for further processing into shaped bodies which have a glassy, crystalline or partially crystalline structure.

For the production of porous substances, for example, foamed glass, there have already been proposed methods and apparatuses in the operation of which a mixture of glass powder and foaming agents are passed through an oven having, in uninterrupted sequence, a heating zone, a sintering zone and a cooling zone. In the sintering zone, gas released by the foaming agent is entrapped in the softened glass in the form of small gas bubbles.

Further, there has been proposed for the production of foamed glass a method and an apparatus in which already molten unrefined glass of low viscosity is passed through an agitator and mixed with the oven atmosphere and consequently, is foamed. Additionally, during the agitation, gas at a temperature of at least equal to the temperature of the melt can be injected into the melt.

The known flame melting methods and the apparatuses necessary for carrying out these methods have the disadvantage that they exhibit a very low thermal efficiency. This low thermal efficiency is attributable firstly to the fact that a great portion of the heat is lost in the form of hot exhaust gases and the occurrence of uncontrollable currents in the entire system and secondly to the fact that the necessary apparatus is of very large dimensions whereby there occurs very extensive radiation of heat. Furthermore the specific fusion capacity with reference to the surface area of the melt or the volume of the melt is too small since the surface of the melt through which heat exchange takes place is too small.

The aforementioned conditions are more favorable in the fluidized bed methods and corresponding apparatuses; however, with respect to these methods and apparatuses, the circulation of gases and of the melt is very difficult to control and, accordingly, it is very difficult to attain uniform melting.

By the use of the known induction melting method and the corresponding apparatus, very high temperatures can indeed be attained; however, as a rule, only batchwise melting in a crucible is possible since the throughput would be too small to permit continuous processing. This small throughput is caused by the insufficient heat transfer coefficients from the melt crucible, the induction heating elements or the melt to the starting material. These insufficient heat transfer coefficients in turn are due to insufficient surface contact between heated parts of the apparatus and the material to be melted as well as to unfavorable circulation conditions resulting from the high viscosity of the molten material.

A further disadvantage of all the aforementioned known methods is the wearing out of the refractory materials of the melt apparatus by the molten material heated to very high temperatures.

The known methods and apparatuses for the production of shaped bodies of porous, vitreous substances have a still further disadvantage that they involve processing independently from the melting of the basic glass, whereby yet another heating and melting as well as the carrying out of a foaming process must be carried out in special apparatus. Thus, for example, in the method and apparatus by which the porous, vitreous substances are produced by the agitation of a melt of the basic glass and the injection of heated gases thereinto, additionally necessary are premelting apparatus with suitable agitators as well as preheating apparatus for the gas which is to be injected. In every case, there must be made expenditures in addition to those for the basic glass melting process which expenditures are, consequently, not profitable and whereby, moreover, a continuous production facility does not result.

According to the present invention, there is provided a method and apparatus which overcomes the aforementioned shortcomings of the prior art. In contrast to the prior art, the present invention provides a continuous method and an apparatus therefor. Moreover, the present invention provides use of high temperatures whereby there results a maximum throughput or a maximum specific fusion capacity and therewith a higher thermal efficiency. Likewise, by the provision of high thermal capacity of the melting apparatus, the present invention provides a minimum wearing out of the refractory materials of the melting apparatus and by the provision of static conditions provides controllability of the circulation of the heating medium and of the molten material.

According to a preferred embodiment of the invention, material to be heated, melted or softened is conducted with a molten metal such as pure tin or alloy such as copper-tin alloys or other suitable fusible substance to serve as a heat carrier such as a salt, e.g., sodium or potassium carbonate, or oxide melt or a dielectric, approximately vertically either downwardly under the influence of gravity or upwardly under the influence of buoyancy through a processing zone. Where upward flow of the material being treated is desired, the heat carrier is selected to have a higher specific gravity than the material being treated and where downward flow of the material being treated is desired, the heat carrier is selected to have a lower specific gravity than the material being treated. Alternatively or additionally, the heat carrier can be motivated by means of electrical or magnetic fields or by mechanical, hydraulic or pneumatic means. For example, by the application of a rotary field the heat carrier can be placed in rotation. Thus, the direction of movement of the material being treated is diverted from the vertical. The centrifugal force resulting from the rotation leads to an essentially improved separation of the material being treated, reaction products of the heat carrier and reaction products of any gas generator employed from the material being treated. The heat carrier is heated inductively, capacitively, by electrically direct or indirect resistance heating, by the use of combustion heat or by a combination of these heating methods. The heat carrier transfers this heat to the material to be heated, melted or softened, which material is then removed either upwardly or downwardly from the heat carrier.

For the purpose of producing porous products in the case of the upward motion of the material to be heated, melted or softened, either a gas forming substance is added, which substance gives off a gas at a high temperature or the material being treated is selected to produce exhaust gas by the heating, melting or softening thereof. The gas migrates in the form of small gas bubbles through the heat carrier and mixes in this form with the molten, or softened material. A like effect can be obtained additionally or alternatively by injecting a gas into the heat carrier.

For the carrying out of this method, an apparatus is necessary in which there is in a refractory container which is resistant to the heat carrier, the heat carrier being heated by any of the methods mentioned above or by a combination of these heating methods. The container at its bottom opening is provided with a closure in which one or more inlet means are arranged and at its top opening with a refractory receptacle. Of course, if the material to be treated is of greater specific gravity than the heat carrier selected, the inlet means for the material to be treated and for the injection of gas would be at the top and the refractory receptacle would be on the bottom. Alternatively, the inlets may be disposed intermediate the ends of the container. Moreover, different components of the material to be treated may be introduced at different points. A further alternative is to disperse the material to be treated in a quantity of the heat carrier prior to introduction into the heating zone. If desired, the material to be heated, melted or softened may be heated by direct resistance heating in which instance, the heat carrier may serve as one electrode and the other electrode may be arranged externally thereof.

The method and apparatus of the invention has the advantage that the heat carrier surrounds on all sides the dispersed material which is to be heated, melted or softened whereby a maximum heat transfer surface area is attained. The heated heat carrier gives over its heat directly to the material to be heated, melted or softened which consequently is done with a maximum thermal efficiency as well as a high fusion capacity.

The method of the invention is carried out in a compact, relatively small apparatus which has a small external surface area and, accordingly, there is a very small loss of heat by radiation. Moreover, there are excellent circulation conditions in the apparatus.

The compactness of the apparatus also makes it practical to conduct the heating, melting or softening under pressure, vacuum or a protective gas atmosphere.

Since the material being heated, melted or softened comes directly into contact at its highest temperatures only with the refractory receptacle at the top or the bottom of the container and not with the refractory container itself, the refractory container itself is essentially spared of wear. On the other hand, repair or replacement of the receptacle can be accomplished in a particularly short time.

The method and the apparatus of the invention makes possible the continuous production at high temperatures of superior quality vitreous, partially crystalline or entirely crystalline material in dense or porous form.

Moreover, by the provision of suitable inlets in the receptacle at one end of the container or in the closure at the other end of the container, it is possible quickly to remove one heat carrier and substitute another heat carrier whereby the apparatus may quickly be adapted for treatment of material different from that previously treated.

The invention will now be described further by reference to the drawings in which.

Figure 1:
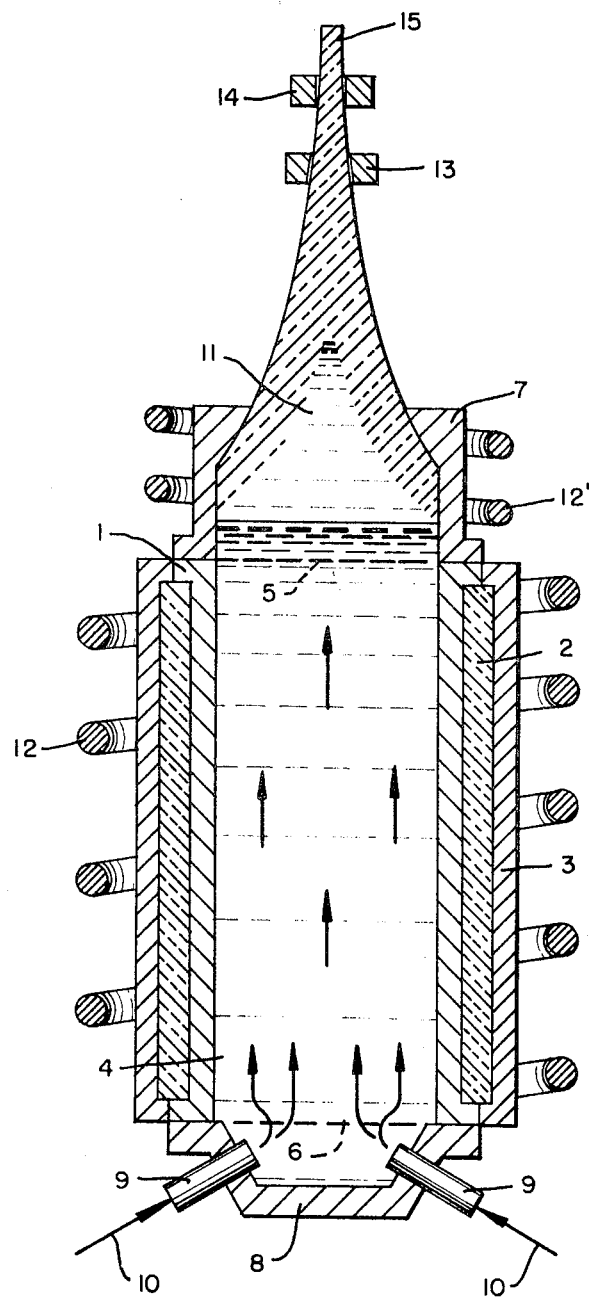
FIG. 1 is a vertical cross section of an apparatus according to the invention.

A cylindrical container 1 (FIG. 1) is provided with a layer of insulation 2 and a mantle 3 thereabout. At the lower opening 6 of the container 1 is provided a closure 8 through openings in which two inlet conduits 9 are provided. At the upper open end 5 of the container 1 is arranged a receptacle 7.

In the container 1 is a heat carrier 4 which is heated by means of an induction winding 12 which is spirally arranged about substantially the entire container. By means of the induction winding 12 a fixed temperature is maintained for the heat carrier 4.

The material to be heated, melted or softened 10 is introduced into the inductively heated heat carrier 4 and by virtue of buoyancy migrates substantially vertically upwardly to the top of the container. It will be appreciated that when it is intended that the flow be upward as illustrated, the heat carrier should be such that it has a higher specific gravity than the material to be treated and that when the flow is to be downwards, instead, the heat carrier should be selected so that, conversely, it has a lower specific gravity than the material to be treated.

The heat carrier 4 transfers its heat to the material being treated 10 whereby the material 10 is heated, melted or softened as desired. The thus treated material collects as a body 11 above the heat carrier 4 in the receptacle 7.

By means of a second induction winding 12', the molten or softened body of material 11 is additionally heated so that it may continuously be withdrawn from the receptacle 7 through a shaping apparatus 13 and a cooling apparatus 14 in the form of a body 15 such as a rod, tube, block or sheet, the formation of a tube being facilitated, if desired, by injection of a stream of air at the center of the shaping apparatus.

Figure 2:
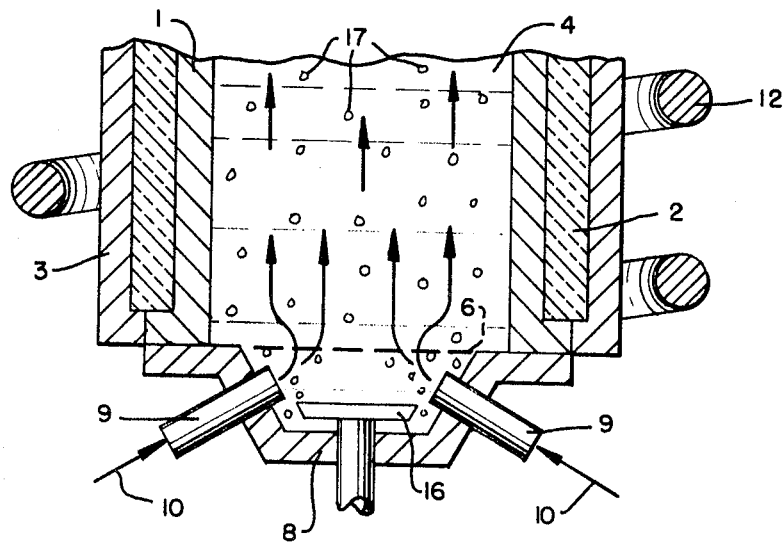
FIG. 2 is a view of the same nature as FIG. 1, an enlargement of the modification of the bottom of the apparatus of FIG. 1.

For the introduction of a gas into the process, there may be provided a modification (FIG. 2) of the previously discussed apparatus whereby there is additionally provided through the closure 8 a spray head 16. By means of the spray head 16, air or another gas is introduced in finely divided form into the heat carrier 4 and migrates through the heat carrier 4 in the form of small bubbles which combine with the material being treated so that the body 11 of that material is porous. Additionally or alternatively to this mode of introducing gas, the materials being treated themselves may give off sufficient exhaust gases to produce the desired porosity or that material may be mixed with a substance which under the influence of heat evolves a gas.

Figure 3:
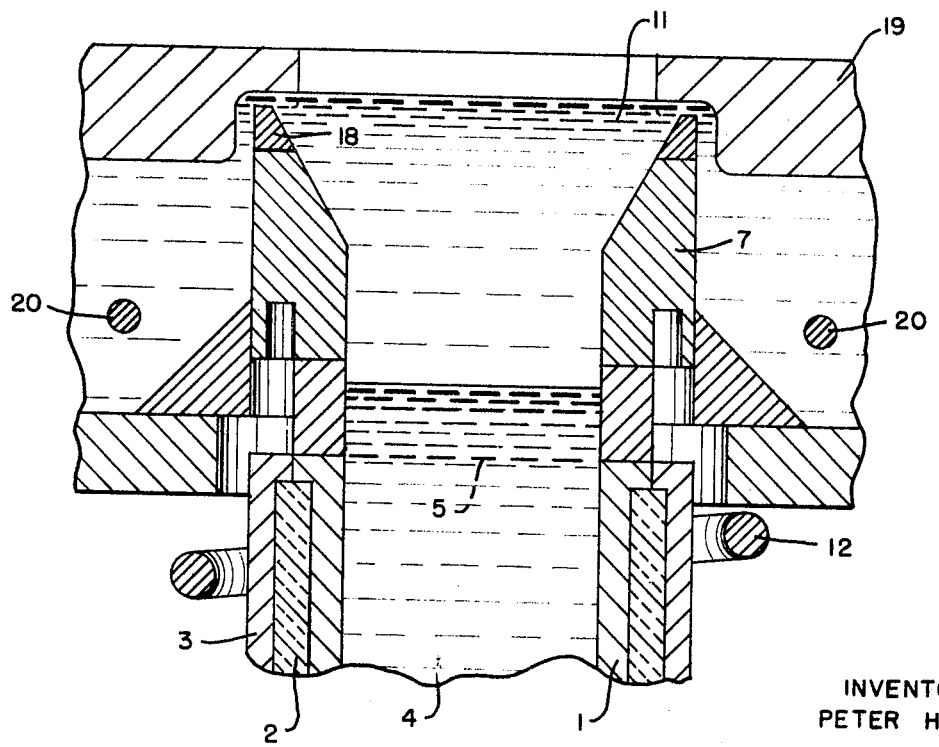
FIG. 3 is another view of the same nature as FIG. 1, an enlargement of the modification of the top of the apparatus of FIG. 1.

In a further modification of the apparatus, there is included at the top thereof an apparatus 19 for further treatment of the body of the softened or molten material 11 (FIG. 3). In the apparatus 19, the body of material 11 passes over one or more edges 18 in one or more apparatuses 19. The heat carrier 4 serves as an electrode and an opposite electrode 20 is provided in the apparatus 19 whereby the material 11 is directly heated by resistance. Refining of the material thereby takes place by intensive heating at the edge 18 where the material 11 is present only as a thin layer.

The heat carrier must have a melting point below the melting point of the material being treated if the treatment comprises melting or below the softening point of the material being treated if the treatment comprises softening or simply below the temperature to which the material being treated is to be treated. Likewise, the boiling point or vaporization temperature of the heat carrier should lie above or only insignificantly under the temperature to which the material being treated is to be heated. Innumerable examples of suitable heat carriers, therefore, could be given. Pure tin (99 percent tin) or tin-copper alloys, for example, may be used for the melting of glass grit, glass frit, quartz sand or quartz. For the melting of high melting quartz materials, iron or iron-carbon or iron-carbon-silicon alloys, for example, are suitable. Particularly in instances in which reaction between the heat carrier and the material being treated is not harmful or even is desired, melts of salts or oxides or mixtures thereof are suitable heat carriers; for example, for the melting of silica or mixtures of silica and calcium oxide, sodium or potassium carbonate are suitable heat carriers. For treating a material at temperatures under 400° C., liquid dielectrics may be used as heat carriers, such as high molecular weight polyolefin, e.g., polyethylene or polyprophylene, which may be heated capacitively for example.

For the introduction of a gas by chemical means, there may be employed any substance which at the elevated temperatures in question gives off a preferably inert or reducing gas, for example, hydrides and nitrides, preferably of an alkali or alkali earth metal, or carbonates (to yield $CO_2$). For very high temperatures, as encountered, for example, in the production of porous quartz glasses, an example of a suitable gas generating means is a mixture of calcium cyanamide and carbon, which at temperatures over 1,300° C. yields nitrogen. A further example of a gas-forming substance which may be employed is coal dust which has the advantage of forming a reducing atmosphere. For the direct introduction of gas by means of a spray head particularly suitable are oxygen-free gases which at the treating temperatures are the most inert (for example, nitrogen, noble or rare gases, and mixtures of these) or which are reducing (for example, hydrogen).

What I claim is:

1. A method of continuously melting a glassy material of the group consisting of sand, quartz, alumina and glass, comprising disposing in an upright, elongated heating zone a fusible substance immiscible and nonreactive with the glassy material, having a boiling point no lower than the melting point of the glassy material and having a specific gravity higher than the specific gravity of the glassy material, heating said substance to maintain said substance in a fused condition and at a temperature no higher than its boiling point and no lower than the melting point of the glassy material, introducing the glassy material into the fused substance near the bottom end of said zone so that the glassy material migrates upwardly through the fusible substance and simultaneously is melted, introducing a gas into said fused substance near the bottom of said zone so that said gas forms bubbles in said fused substance and said bubbles migrate upwardly through said fused substance and combine with said molten glassy material and render said material porous, said porous material migrating to the top of the zone and forming a layer overlying the fusible substance, and withdrawing the porous material from said overlying layer.

2. Method according to claim 1, in which the withdrawing is continuous and further comprising forming the withdrawn material into a shaped body.

3. Method according to claim 1, in which the introduction of gas into the zone comprises generation of gas in the zone in situ.

4. Method according to claim 1, in which gas is introduced into the zone from an external source.